United States Patent
Hidai et al.

(10) Patent No.: US 7,107,414 B2
(45) Date of Patent: Sep. 12, 2006

(54) EEPROM EMULATION IN A TRANSCEIVER

(75) Inventors: Takashi Hidai, Palo Alto, CA (US); Michael A. Robinson, Fremont, CA (US); Frederick W. Miller, San Jose, CA (US)

(73) Assignee: Avago Technologies Fiber IP (Singapore) Ptd. Ltd., Singapore (SG)

( * ) Notice: Subject to any disclaimer, the term of this patent is extended or adjusted under 35 U.S.C. 154(b) by 659 days.

(21) Appl. No.: 10/346,479

(22) Filed: Jan. 15, 2003

(65) Prior Publication Data

US 2004/0136719 A1    Jul. 15, 2004

(51) Int. Cl.
*G06F 12/04*    (2006.01)
(52) U.S. Cl. ........................................ 711/154
(58) Field of Classification Search ............... 711/14, 711/154, 118
See application file for complete search history.

(56) References Cited

U.S. PATENT DOCUMENTS 4,945,229 A    7/1990    Daly et al.
5,455,934 A  * 10/1995  Holland et al. ............ 711/4
6,201,820 B1    3/2001    Palmer

FOREIGN PATENT DOCUMENTS

WO    WO 95/18407    12/1944
WO    WO-01/001338    1/2001

OTHER PUBLICATIONS

ATMEL, "AVR302: Software I2C(TM) Slave Implementation", Sep. 1997, Application Note.*
ATMEL, "AVR300: Software I2C(TM) Master Interface", Sep. 1997, Application Note.*
SFF Committee "Information Specification for SFP (Small Formfactor Pluggable) Transceiver", SFF-8074i, Rev 1.0, pp. 1-38 (May 12, 2001), <ftp://ftp.seagate.com/sff>.
SFF Committee "Specification for Diagnostic Monitoring Interface for Optical Xcvrs", SFF-8472, Rev 9.3, pp. 1-10 and 1-29, (Aug. 1, 2002), <ftp://ftp.seagate.com/sff>.

* cited by examiner

*Primary Examiner*—Matthew Kim
*Assistant Examiner*—Paul Schlie (57) ABSTRACT

A transceiver including a controller, a first memory that includes first information, and a second memory accessible by a host is provided. The controller is configured to copy the first information from the first memory to the second memory.

27 Claims, 8 Drawing Sheets

EEPROM EMULATION IN A TRANSCEIVER

THE FIELD OF THE INVENTION

The present invention generally relates to optical transceivers and, more particularly, to EEPROM emulation in a transceiver.

BACKGROUND OF THE INVENTION

Manufacturers or other organizations may collaborate to produce various standards for devices such as electronic devices. These standards may set forth a wide range of design criteria for a device. The criteria may include physical, mechanical, and/or electrical specifications. In order to conform or comply with a standard, a device typically meets all of the called for physical, mechanical, and/or electrical provisions.

One organization that has been formed to set standards for the electronic storage industry is the Small Form Factor (SFF) Committee. The SFF committee may be found at http://www.sffcommittee.com. One set of standards set forth by the Committee includes standards for small form factor pluggable (SFP) transceivers. These standards include the Small Form Factor Pluggable Transceiver MultiSource Agreement (SFP MSA), the SFF-8074i Specification for SFP (Small Form Factor Pluggable) Transceiver, and the SFF-8472 Specification for Digital Diagnostic Monitoring Interface for Optical Transceivers.

A transceiver manufactured in accordance with these SFP standards includes an EEPROM that is accessible by a host coupled to the transceiver. In particular, the SFP standards specify the type and quantity of information that is to be stored in the EEPROM as well as the way in which a host can access and update information in the EEPROM. Although a transceiver may provide a host with a direct connection to an EEPROM, other design goals and constraints may make such a direct connection undesirable or infeasible. In particular, a direct connection between an EEPROM and a host may become undesirable where a transceiver includes a controller that operates in conjunction with firmware or other software. In such as transceiver, EEPROM accesses by a host may take a much longer time than in transceivers with hardware controllers.

It would be desirable to be able to provide a host with fast EEPROM accesses without a direct connection to the EEPROM.

SUMMARY OF THE INVENTION

The present disclosure provides a transceiver including a controller, a first memory that includes first information, and a second memory accessible by a host. The controller is configured to copy the first information from the first memory to the second memory.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A transceiver configured to emulate EEPROM to an external host is shown and described herein. The transceiver is configured to receive transactions configured to access an EEPROM from the external host. The transceiver includes a cache configured to store a copy of the information stored in the EEPROM. In response to an EEPROM read transaction from the host, information is provided to the host from the cache. In response to an EEPROM write transaction, information is received from the host and stored in the cache. The information is also stored in the EEPROM. In response to internal updates to the EEPROM from an internal component of the transceiver, information associated with the update is stored in both the EEPROM and the cache.

Figure 1:
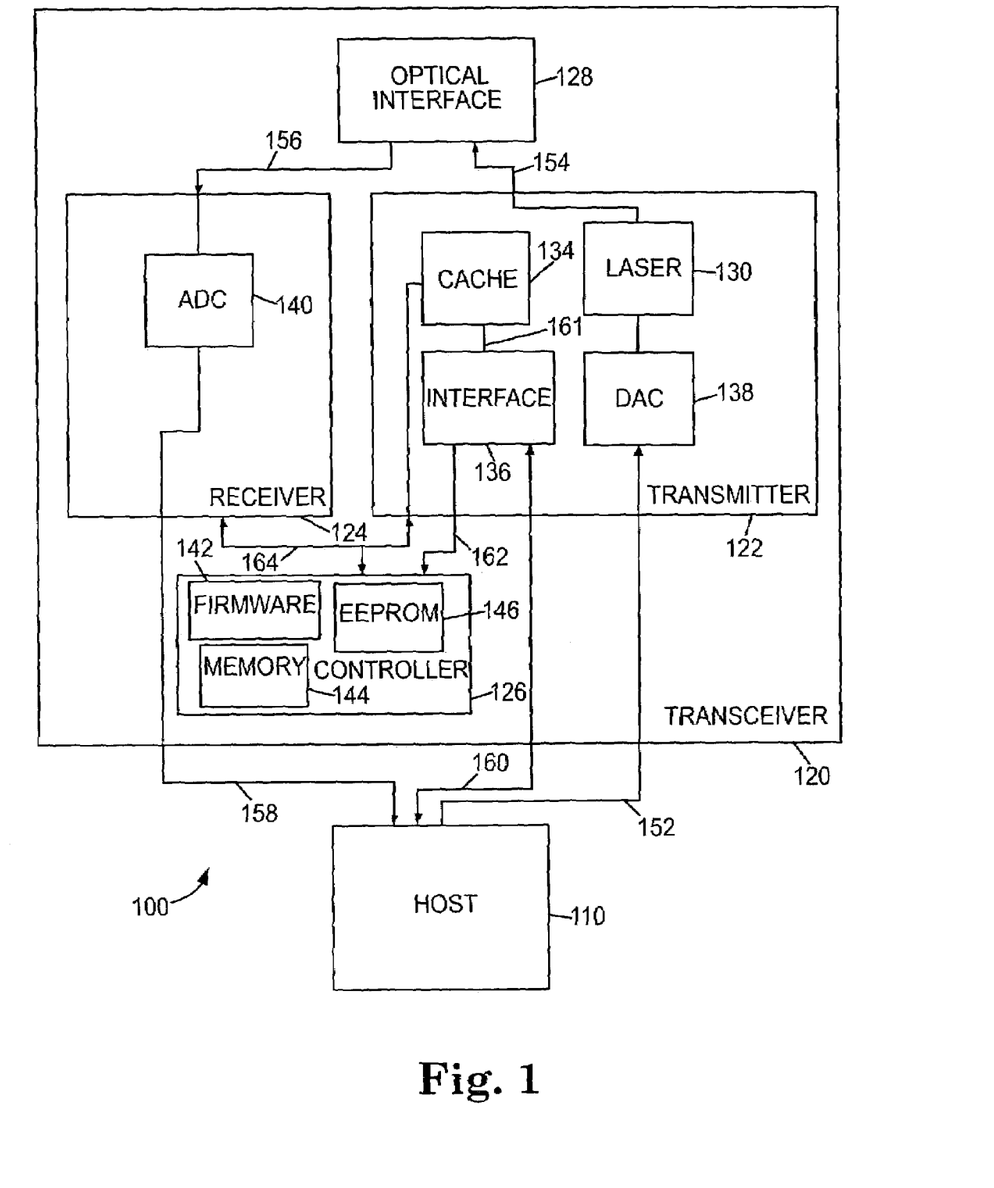
FIG. 1 is a block diagram illustrating an embodiment of a system that includes a transceiver configured to emulate EEPROM.

FIG. 1 is a block diagram illustrating an embodiment of a system 100 that includes a transceiver 120 configured to emulate EEPROM to a host 110. As shown in FIG. 1, host 110 is coupled to transceiver 120. Transceiver 120 includes a transmitter 122, a receiver 124, a controller 126, and an optical interface 128. Transmitter 122 includes a laser 130, a cache 134, an interface 136, and a digital-to-analog converter (DAC) 138. Receiver 124 includes an analog-to-digital converter (ADC) 140. Controller 126 includes firmware 142, a memory 144, and an EEPROM 146.

Host 110 may be any type of wired or wireless device configured to operate in conjunction with transceiver 120. Host 110 is external to transceiver 120. Examples of such devices include a test system, a server computer system, a personal computer system, a laptop computer system, a handheld computer system, a personal digital assistant, and a mobile telephone.

Transceiver 120 comprises an optical transceiver configured to communicate with host 110 by sending and receiving electrical signals as described in additional detail herein below. Transceiver 120 also communicates with another device (not shown) by sending and receiving optical signals using optical interface 128. Optical interface 128 may be a Fibre Channel interface or another type of optical interface.

In one embodiment, transceiver 120 conforms to the Small Form Factor Pluggable Transceiver MultiSource Agreement (SFP MSA), the SFF-8074i Specification for SFP (Small Form Factor Pluggable) Transceiver, and the SFF-8472 Specification for Digital Diagnostic Monitoring Interface for Optical Transceivers. The SFP MSA, the SFF-8074i specification, and the SFF-8472 specification are available from http://www.sffcommittee.com or ftp://ftp.seagate.com/sff/. In other embodiments, transceiver 120 may conform to other specifications.

In operation, transmitter 122 comprises an optical transmitter configured to receive digital output signals from host 110 using a connection 152. Digital-to-analog converter 138 converts the digital output signals to analog output signals and provides the analog output signals to laser 130. The digital output signals and the analog output signals comprise electrical signals. Laser 130 generates optical output signals in response to the analog output signals and provides the optical output signals to optical interface 128 using a connection 154.

Receiver 124 comprises an optical receiver configured to receive optical input signals from optical interface 128 using a connection 156. Analog-to-digital converter 140 converts the optical input signals from analog input signals to digital input signals and provides the digital input signals to host 110 using a connection 158. The digital output signals and the analog output signals comprise electrical signals.

Transceiver 120 also communicates with host 110 using an electrical connection 160. In particular, transceiver 120 receives control signals from host 110 using connection 160. Transceiver 120 also provides information to host 110 using connection 160. In the embodiment of FIG. 1, electrical connection 160 couples host 110 to transmitter 122 and may be any suitable serial or parallel connection. One suitable connection would be an I2C connection, as provided by the I2C-Bus Specification available from Philips Semiconductors. In embodiments where connection 160 is an I2C connection, interface 136 comprises an I2C bus interface. In addition, connection 160 and interface 136 may conform to the 2-wire serial CMOS EEPROM protocol defined for the ATMEL AT24C01A/02/04 family of components, as provided by the ATMEL AT24C01A/02/04 Data Sheet available from Atmel at http://www.atmel.com/atmel/acrobat/doc0180.pdf.

Interface 136 may comprise hardware or a combination of hardware and software components. Cache 134 may be any type of volatile or non-volatile memory configured to store information. In one embodiment of FIG. 1, cache 134 comprises SRAM.

Controller 126 provides control signals to and receives feedback signals from transmitter 122 and receiver 124 using a connection 164. Connection 164 may be any suitable serial or parallel connection. One suitable connection would be an I2C connection, as provided by the I2C-Bus Specification available from Philips Semiconductors. In embodiments where connection 164 is an I2C connection, controller 126 acts as a master and transmitter 122 and receiver 124 act as slaves.

Controller 126 includes firmware 142 that is executable by controller 126 to cause the control signals to be generated and the feedback signals to be received and processed. Memory 144 may be any type or combination of volatile and non-volatile storage including registers, flash memory, or RAM. In other embodiments, controller 126 may use other combinations of hardware and/or firmware or software to perform the functions described herein.

In the embodiment of FIG. 1, EEPROM 146 comprises EEPROM memory. In other embodiments, EEPROM 146 may be any other type of non-volatile memory.

In the embodiment of FIG. 1, EEPROM 146 is included as part of controller 126. In other embodiments, EEPROM 146 may be located separate from (i.e. not included in) controller 126 and/or may be included in other components of transceiver 120 in other embodiments. In embodiments where EEPROM 146 is separate from controller 126, EEPROM 146 may be an EEPROM from the ATMEL AT24C01A/02/04 family of components as described by the ATMEL AT24C01A/02/04 Data Sheet referenced above.

Figure 2:
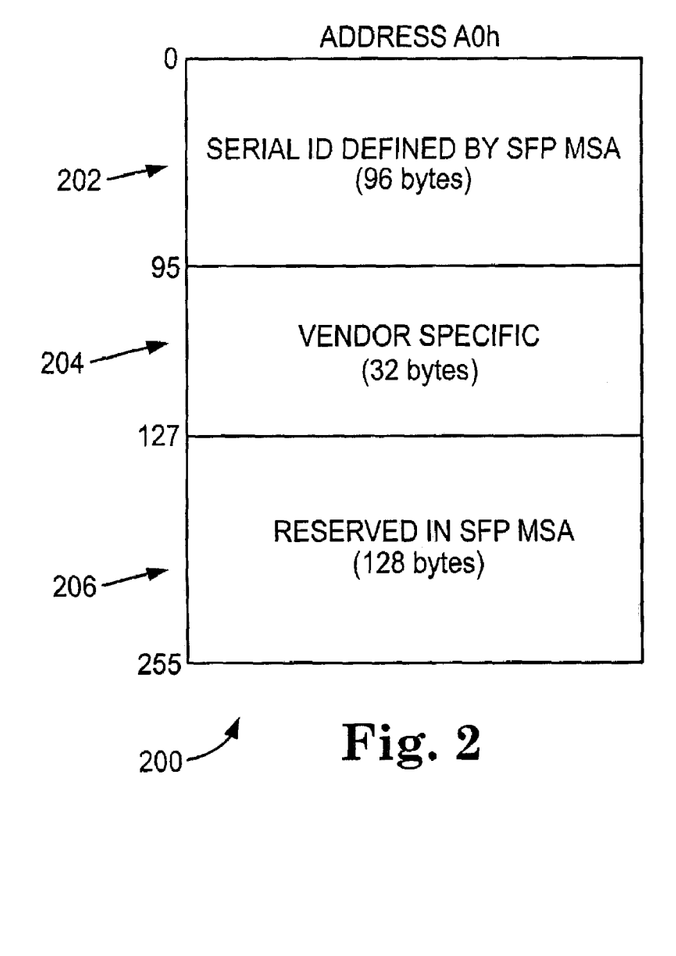
FIG. 2 is a table illustrating an embodiment of a first memory map.
Figure 3:
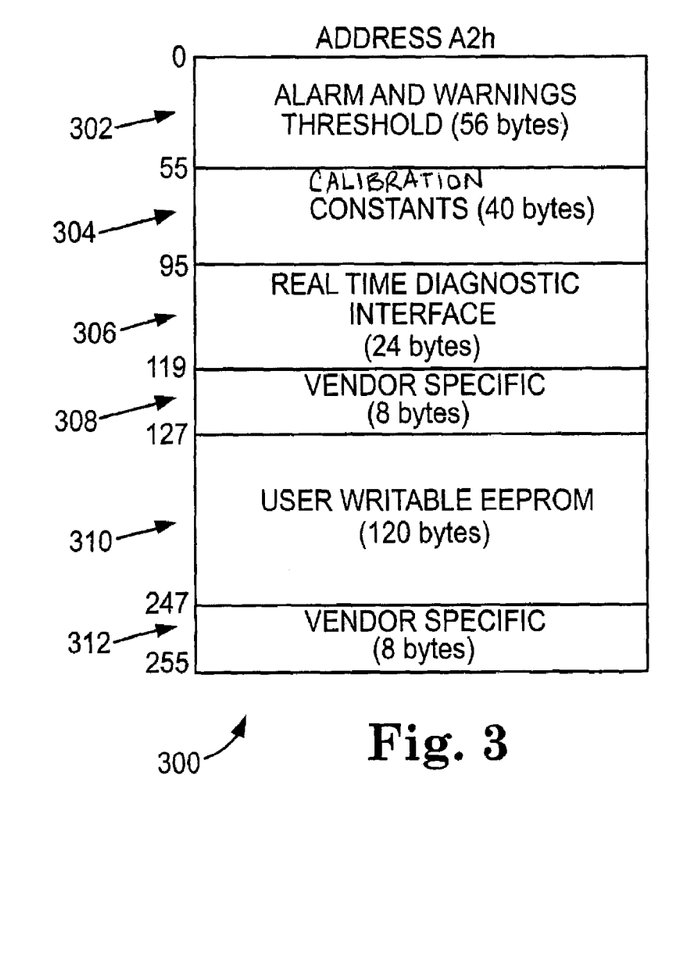
FIG. 3 is a table illustrating an embodiment of a second memory map.

Information storable in EEPROM 146 is defined by the SFP MSA, the SFF-8074i specification, and the SFF-8472 specification referenced above. FIGS. 2 and 3 provide an overview of this information.

FIG. 2 is a table illustrating an embodiment of a first memory map 200. Memory map 200 is stored in EEPROM 146 and is accessed by host 110 using a device address of A0h. Memory map 200 includes 256 bytes of information where bytes 0 through 95 are for serial identification information as defined by the SFP MSA as indicated by a block 202, bytes 96 through 127 are for vendor specific information as indicated by a block 204, and bytes 128 through 255 are reserved by the SFP MSA as indicated by a block 206.

FIG. 3 is a table illustrating an embodiment of a second memory map 300. Memory map 300 is stored in EEPROM 146 and is accessed by host 110 using a device address of A2h. Memory map 300 includes 256 bytes of information where bytes 0 through 55 are for alarm and warnings thresholds information as indicated by a block 302, bytes 56 through 95 are for calibration constants as indicated by a block 304, bytes 96 through 119 are for real time diagnostic interface information as indicated by a block 306, bytes 120 through 127 are for vendor specific information as indicated by a block 308, bytes 128 through 247 are for a user writable EEPROM area as indicated by a block 310, and bytes 248 through 255 are for vendor specific information as indicated by a block 312.

Additional details regarding the each of the blocks in memory maps 200 and 300 shown in FIGS. 2 and 3 may be found in the SFP MSA, the SFF-8074i specification, and the SFF-8472 specification referenced above. In other embodiments, transceiver 120 may store memory maps other than those shown in FIGS. 2 and 3.

As described by the SFP MSA, the SFF-8074i specification, and the SFF-8472 specification, transceiver 120 is configured to provide host 110 with an ability to read information from and write information to EEPROM 146. Transceiver 120 performs these functions using controller 126, interface 136, EEPROM 146, and cache 134. In particular, controller 126 causes information to be copied from EEPROM 146 to cache 134 in response to being powered up or reset. In response to a read transaction from host 110, interface 136 provides information associated with the read transaction to host 110 from cache 134 using a connection 161. In response to a write transaction to EEPROM 146 from host 110, interface 136 causes information associated with the write transaction is stored in cache 134 using connection 161. Interface 136 also causes the information to be stored in EEPROM 146 by providing a signal, such as an interrupt signal or a flag to be polled by controller 126, to controller 126 using a connection 162. In response to the signal from interface 136, controller 126 receives the information from cache 134 and stores it in EEPROM 146. Controller 126 also causes updates to EEPROM 146 that are generated by internal components of transceiver 120 to be copied into cache 134. Additional details of the operation of controller 126, interface 136, EEPROM 146, and cache 134 will now be-described with reference to FIGS. 4 through 9.

Figure 4:
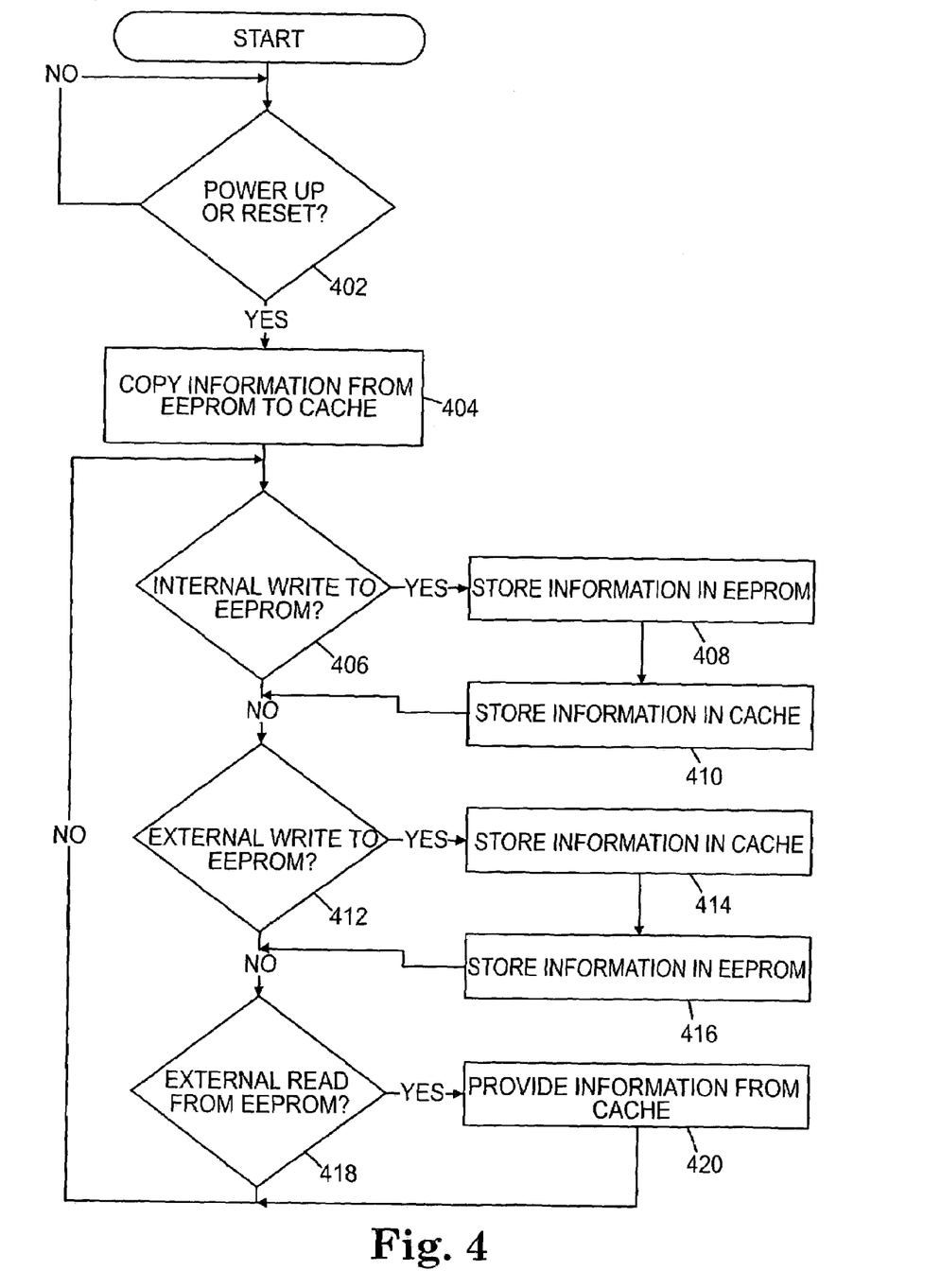
FIG. 4 is a flow chart illustrating an embodiment of a method for EEPROM emulation in a transceiver.

FIG. 4 is a flow chart illustrating an embodiment of a method for EEPROM emulation in a transceiver. The embodiment of the method of FIG. 4 will be described with reference to FIG. 1. In FIG. 4, transceiver 120 is powered up (i.e. turned on) as indicated in a block 402. In response to being powered up, transceiver 120 causes information to be copied from EEPROM 146 to cache 134 as indicated in a block 404. In the embodiment of FIG. 1, controller 126 causes the information to be copied from EEPROM 146 to cache 134. In other embodiments, another component of transceiver 120 may cause this function to occur.

A determination is made as to whether an internal write to EEPROM 146 has been received as indicated in a block 406. An internal write may be any type of transaction received from a component of transceiver 120, such as transmitter 122 or receiver 124, which is configured to cause information to be stored in EEPROM 146. If an internal write to EEPROM has been received, then information associated with the write transaction is stored in EEPROM 146 as indicated in a block 408. The information is also stored in cache 134 as indicated in a block 410. Although the functions shown in blocks 408 and 410 may occur in any order, the function of block 408 may occur prior to the function of block 410 in the embodiment of FIG. 1. If an internal write to EEPROM has not been received, then the method continues at a block 412.

A determination is made as to whether an external write to EEPROM has been received as indicated in block 412. An external write may be any type of transaction received from an external host, such as host 110, which is configured to cause information to be stored in EEPROM 146. If an external write to EEPROM has been received, then information associated with the write transaction is stored in cache 134 as indicated in a block 414. The information is stored in EEPROM 146 as indicated in a block 416. Although the functions shown in blocks 414 and 416 may occur in any order, the function of block 414 may occur prior to the function of block 416 in the embodiment of FIG. 1. If an external write to EEPROM has not been received, then the method continues at a block 418.

A determination is made as to whether an external read from EEPROM has been received as indicated in block 418. An external read may be any type of transaction received from an external host, such as host 110, which is configured to cause information to be read from EEPROM 146. If an external read from EEPROM has been received, then information associated with the read transaction is provided to host 110 from cache 134. If an external read from EEPROM has not been received, then the method repeats the function of block 406.

The method continues by repeating the function of block 406.

Figure 5:
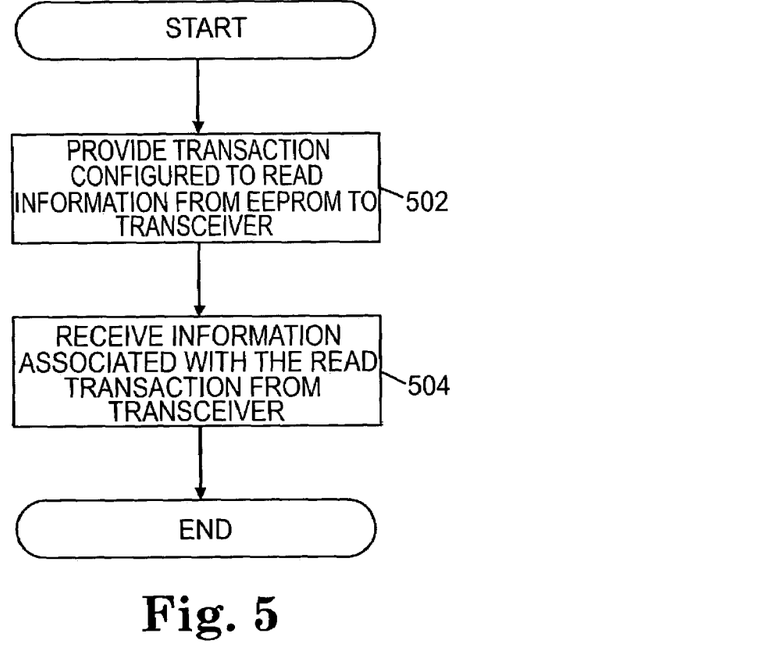
FIG. 5 is a flow chart illustrating an embodiment of a method for receiving information from an EEPROM of a transceiver.
Figure 6:
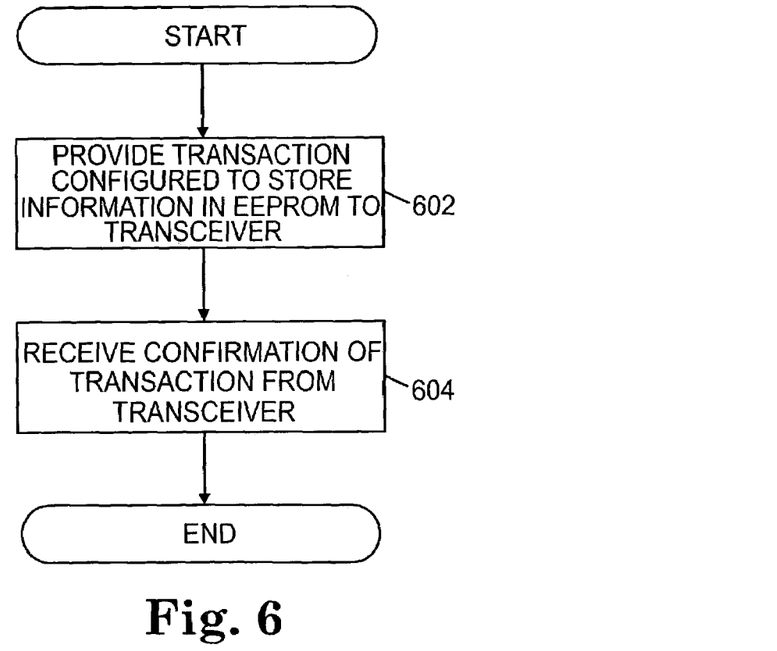
FIG. 6 is a flow chart illustrating an embodiment of a method for providing information to an EEPROM of a transceiver.

FIGS. 5 and 6 illustrate the operation of host 110 in conjunction with read and writes to EEPROM 146, respectively.

FIG. 5 is a flow chart illustrating an embodiment of a method for receiving information from an EEPROM of a transceiver by an external host. The embodiment of the method of FIG. 5 will be described with reference to FIG. 1. In FIG. 5, host 110 provides a transaction configured to read from EEPROM 146 to transceiver 120 as indicated in a block 502. Host 110 receives information associated with the read transaction from transceiver 120 as indicated in a block 504. As noted above in the description of FIG. 4, the information is provided to host 110 from cache 134.

FIG. 6 is a flow chart illustrating an embodiment of a method for providing information to an EEPROM of a transceiver. The embodiment of the method of FIG. 6 will be described with reference to FIG. 1. In FIG. 6, host 110 provides a transaction configured to store information in EEPROM 146 to transceiver 120 as indicated in a block 602. Host 110 receives confirmation of the write transaction from transceiver 120 as indicated in a block 604. The function of block 604 may be omitted in certain embodiments. As noted above in the description of FIG. 4, transceiver 120 stores the information in cache 134 in addition to storing the information in EEPROM 146.

Figure 7:
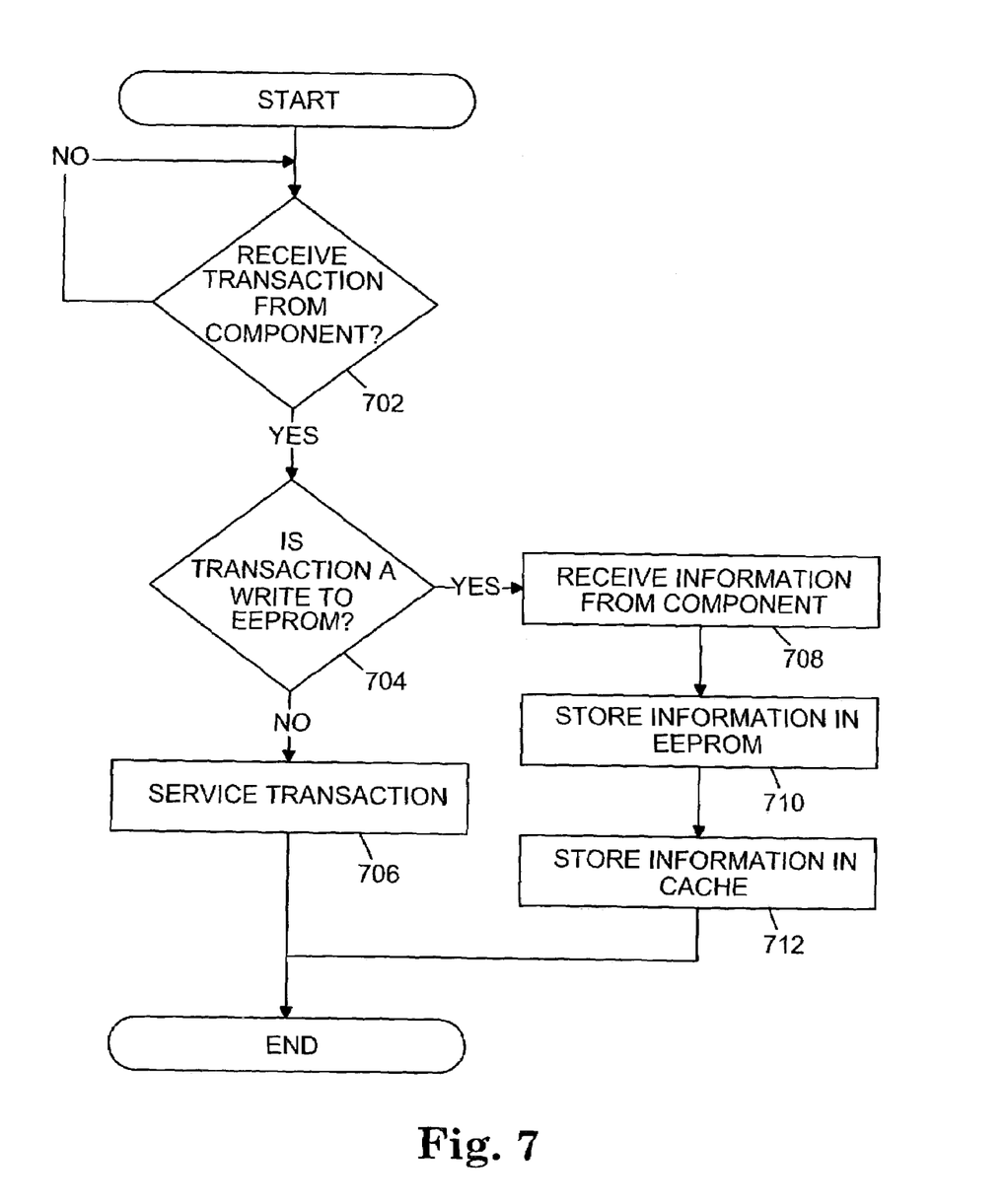
FIG. 7 is a flow chart illustrating an embodiment of a method for writing internal information to an EEPROM.

FIG. 7 is a flow chart illustrating an embodiment of a method for writing internal information to an EEPROM. The embodiment of the method of FIG. 7 will be described with reference to FIG. 1. In FIG. 7, a determination is made as to whether controller 126 has received a transaction from a component of transceiver 120 as indicated in a block 702. If controller 126 has not received a transaction from a component of transceiver 120, then the method repeats the function of block 702 at a later time. If controller 126 has received a transaction from a component of transceiver 120, then a determination is made as to whether the transaction is a write to EEPROM 146 as indicated in a block 704. If the transaction is not a write to EEPROM 146, then the transaction is serviced by controller 126 in accordance with the request as indicated in a block 706.

If the transaction is a write to EEPROM 146, i.e. a transaction configured to store information in EEPROM 146, then controller 126 receives the information associated with the transaction from the component as indicated in a block 708. Controller 126 stores the information in EEPROM 146 as indicated in a block 710. Controller 126 also stores the information in cache 134 as indicated in a block 712.

Figure 8:
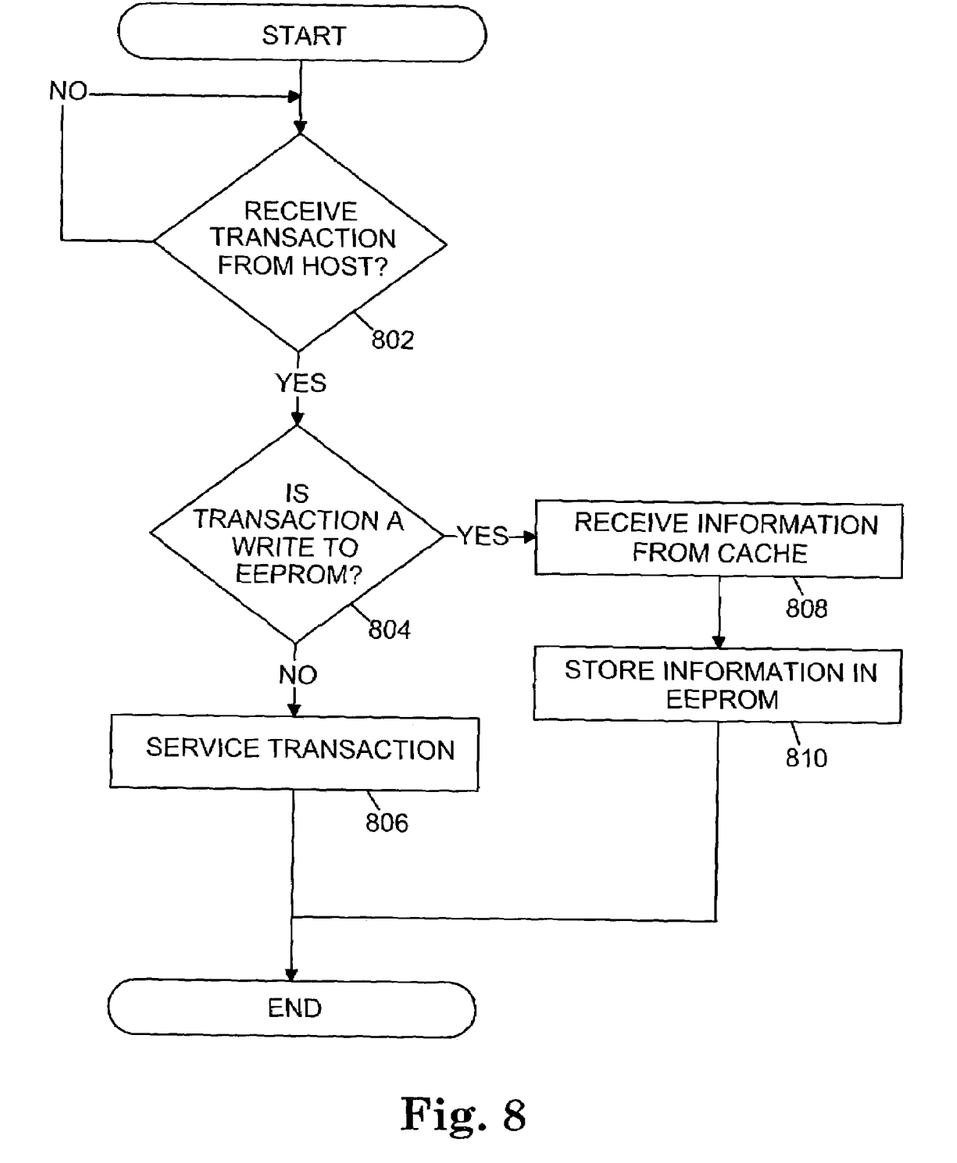
FIG. 8 is a flow chart illustrating an embodiment of a method for writing external information to an EEPROM.

FIG. 8 is a flow chart illustrating an embodiment of a method for writing external information to an EEPROM. The embodiment of the method of FIG. 8 will be described with reference to FIG. 1. In FIG. 8, a determination is made as to whether controller 126 has received a transaction from host 110 as indicated in a block 802. As described below with reference to FIG. 9, the transaction may be handled by interface 136 prior to being received by controller 126. In particular, controller 126 may determine that it has received a transaction from host 110 by detecting a signal from interface 136. The signal may be an interrupt signal, a flag set by interface 136 for controller 126 to poll, or any other suitable signal. If controller 126 has not received a transaction from host 110, then the method repeats the function of block 802 at a later time.

If controller 126 has received a transaction from host 110, then a determination is made as to whether the transaction is a write to EEPROM 146 as indicated in a block 804. If the transaction is not a write to EEPROM 146, then the transaction is serviced by controller 126 in accordance with the transaction as indicated in a block 806. If the transaction is a write to EEPROM 146, then controller 126 receives information associated with the transaction from cache 134 as indicated in a block 808. Controller 126 stores the information in EEPROM 146 as indicated in a block 810. Controller 126 may provide a confirmation signal to interface 136 and/or host 110 in response to storing the information.

Figure 9:
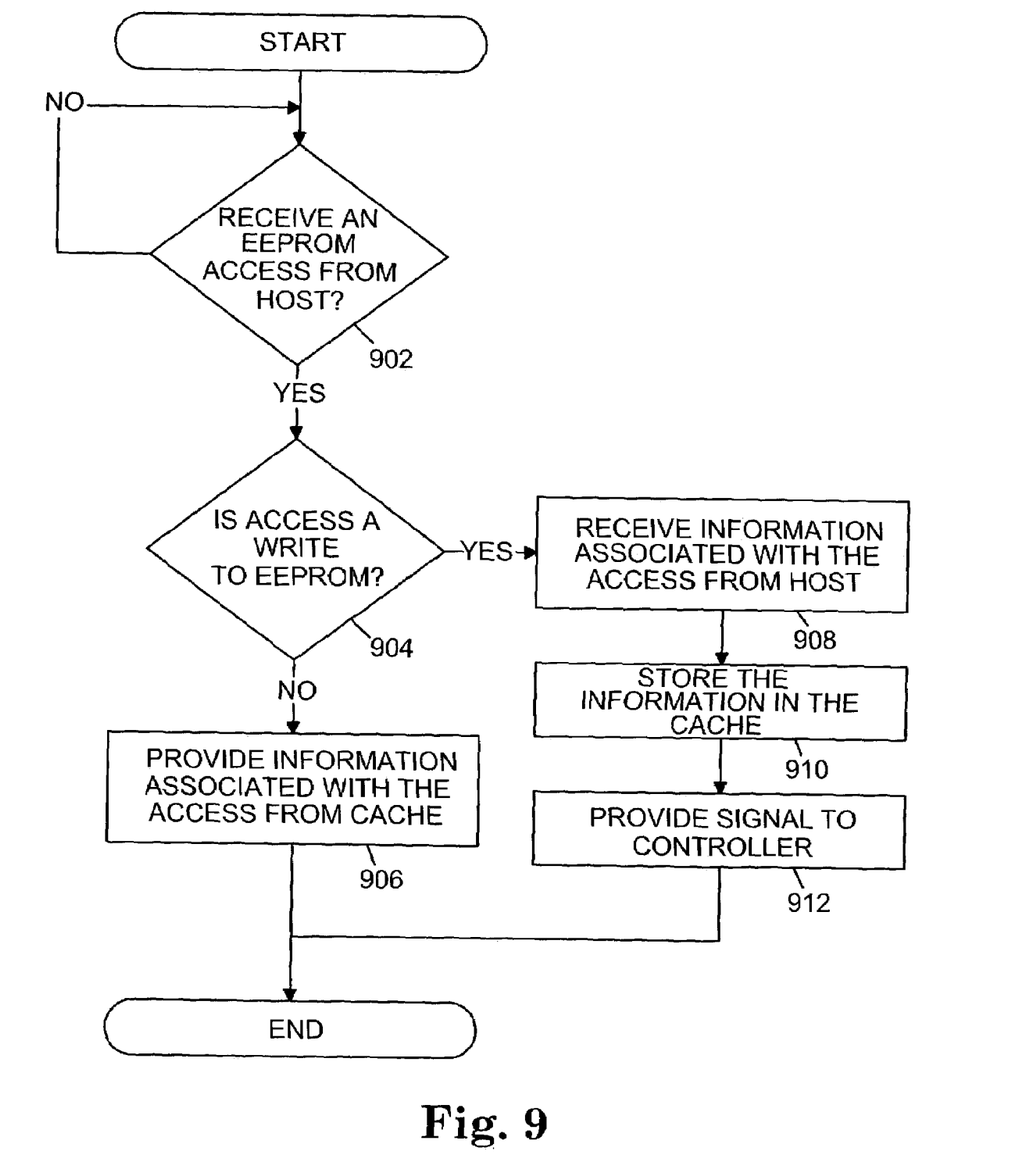
FIG. 9 is a flow chart illustrating an embodiment of a method for handling EEPROM transactions from a host.

FIG. 9 is a flow chart illustrating an embodiment of a method for handling EEPROM transactions from a host. The embodiment of the method of FIG. 9 will be described with reference to FIG. 1. In FIG. 9, a determination is made as to whether interface 136 has received an EEPROM access from host 110 as indicated in a block 902. An EEPROM access may be any transaction configured to read information from or store information in EEPROM 146. If interface 136 has not received an EEPROM access from host 110, then the method repeats the function of block 902 at a later time.

If interface 136 has received an EEPROM access from host 110, then a determination is made as to whether the access is a transaction configured to write to EEPROM 146 as indicated in a block 904. If the request is not a transaction configured to write to EEPROM 146, then the access is a transaction configured to read from EEPROM 146 and interface causes information associated with the access to be provided from cache 134 to host 110 as indicated in a block 906.

If the request is a transaction configured to write to EEPROM 146, then interface 136 receives information associated with the access from host 110 as indicated in a block 908. Interface 136 stores the information in cache 134 as indicated in a block 910. Interface 136 provides a signal to controller 126 as indicated in a block 912 and described above with reference to FIG. 8. Controller 126 stores the information in EEPROM 146 as noted above in block 810. In response to storing the information in cache 134, interface 136 may provide a confirmation signal to host 110. Interface 136 may generate the confirmation signal or receive the confirmation signal from controller 126.

With respect to FIGS. 4 through 9 above, it may be noted that although transceiver 120 appears to provide host 110 with direct access to EEPROM 146 from the perspective of host 110, information is actually exchanged between transceiver 120 and host 110 using cache 134.

Figure 10:
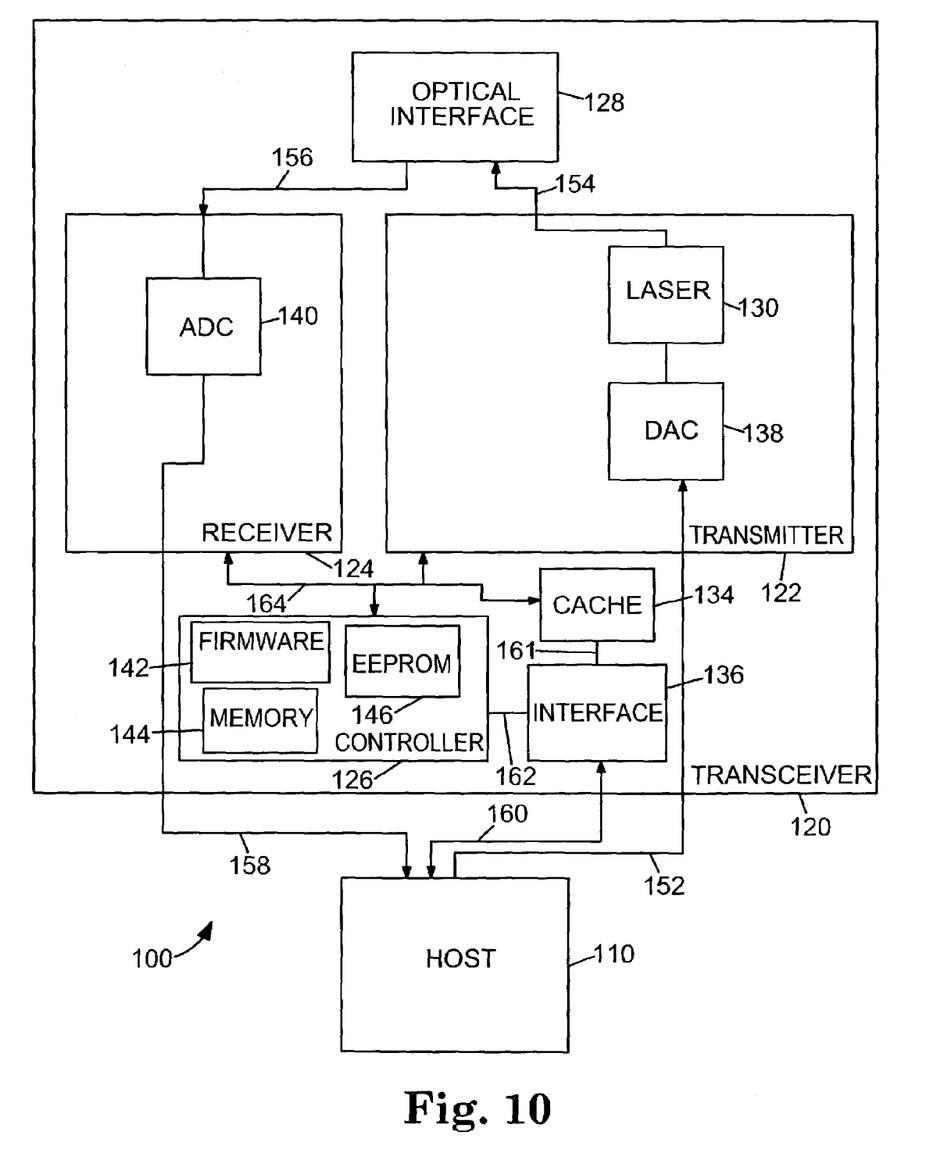
FIG. 10 is a block diagram illustrating an alternative embodiment of a system that includes a transceiver configured to emulate EEPROM.

FIG. 10 is a block diagram illustrating an alternative embodiment of system 100 that includes transceiver 120 configured to emulate EEPROM. The embodiment of FIG. 10 operates in substantially the same way as the embodiment of FIG. 1 as described with reference to FIGS. 2–9. In FIG. 10, however, cache 134 and interface 136 are not included in transmitter 122. This embodiment illustrates that cache 134 and interface 136 may be included in any other portion or component transceiver 120.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A transceiver comprising:
   a controller;
   a first, non-volatile memory that includes first information, the first information defined by the Small Form Factor Pluggable Transceiver MultiSource Agreement (SFP MSA);
   a second memory; and
   an interface coupled to the second memory and configured to couple to a host;
   wherein the controller is configured to copy the first information from the first memory to the second memory in response to the transceiver being powered up, and wherein the interface is configured to cause a portion of the first information to be provided from the second memory to a host without accessing the portion of the first information from the first memory in response to receiving a read transaction configured to read the portion of the first information from the first memory from the host.

2. The transceiver of claim 1 wherein the first memory comprises an EEPROM.

3. The transceiver of claim 1 wherein the second memory comprises a cache.

4. The transceiver of claim 1 further comprising:
   a transmitter that includes the second memory.

5. The transceiver of claim 1 wherein the controller includes the first memory.

6. The transceiver of claim 1 wherein the interface is configured to receive a write transaction configured to cause second information to be stored to the first memory from the host, and wherein the interface is configured to cause the second information to be stored in the second memory in response to receiving the write transaction.

7. The transceiver of claim 6 wherein the interface is configured to provide a signal to the controller in response to the write transaction, and wherein the controller is configured to cause the second information to be stored in the first memory.

8. The transceiver of claim 1 wherein the controller is configured to receive a write transaction configured to cause second information to be stored in the first memory from a component of the transceiver, and wherein the controller is configured to cause the second information to be stored in the second memory.

9. The transceiver of claim 8 wherein the controller is configured to cause the second information to be stored in the first memory.

10. The transceiver of claim 1 further comprising:
    a laser configured to receive electrical signals from the host and configured to generate optical signal signals in response to the electrical signals.

11. A method performed by a transceiver, the method comprising:
    receiving a first transaction configured to cause first information defined by the Small Form Factor Pluggable Transceiver MultiSource Agreement (SFP MSA) to be stored in a first, non-volatile memory in a transceiver;
    storing the first information in a second memory in the transceiver in response to receiving the first transaction;
    storing the first information in the first memory in the transceiver; and
    maintaining the first information in both the first memory and the second memory during operation of the transceiver.

12. The method of claim 11 further comprising:
    receiving the first transaction from a host.

13. The method of claim 12 further comprising:
    receiving a second transaction from the host, the second transaction configured to cause second information to be read from the first memory; and providing the second information from the second memory to the host in response to receiving the second transaction without accessing the second information from the first memory.

14. The method of claim 12 wherein the first memory comprises an EEPROM and wherein the second memory comprises a cache.

15. The method of claim 14 further comprising:
storing the first information in the second memory prior to storing the first information in the first memory.

16. The method of claim 11 further comprising:
receiving the first transaction from a component of the transceiver.

17. The method of claim 16 wherein the first memory comprises an EEPROM and wherein the second memory comprises a cache.

18. The method of claim 17 further comprising:
storing the first information in the first memory prior to storing the first information in the second memory.

19. A system comprising:
a host; and
a transceiver coupled to the host and including a first, non-volatile memory and a second memory;
wherein the transceiver is configured to store first information defined by the Small Form Factor Pluggable Transceiver MultiSource Agreement (SFP MSA) in both the first memory and the second memory during operation of the transceiver, wherein the transceiver is configured to receive a first transaction configured to cause second information to be stored in the first memory, wherein the transceiver is configured to cause the second information to be stored in the second memory, wherein the transceiver is configured to cause the second information to be stored in the first memory subsequent to storing the first information in the second memory, and wherein the transceiver is configured to maintain the second information in both the first memory and the second memory during operation of the transceiver.

20. The system of claim 19 wherein the first memory comprises an EEPROM and wherein the second memory comprises a cache.

21. The system of claim 19 wherein the transceiver includes an interface coupled to the second memory, wherein the interface is configured to receive the first transaction, and wherein the interface is configured to cause the second information to be written to the second memory in response to receiving the first transaction.

22. The system of claim 21 wherein the transceiver includes a controller, wherein the interface is configured to provide a signal to the controller in response to the first transaction, and wherein the controller is configured to cause the second information to be written to the first memory in response to the signal.

23. The system of claim 21 wherein the transceiver includes an interface coupled to the second memory, wherein the interface is configured to receive a second transaction from the host, wherein the second transaction is configured to cause the second information to be read from the first memory, and wherein the interface is configured to provide the second information from the second memory to the host without accessing the second information in the second memory.

24. A transceiver comprising:
a first, non-volatile memory including first information defined by the Small Form Factor Pluggable Transceiver MultiSource Agreement (SFP MSA);
a second memory including a copy of the first information during operation of the transceiver;
first means for receiving a first transaction from a host, the first transaction configured to cause at least a portion of the first information to be read from the first memory; and
second means for causing the portion of the first information to be provided from the second memory to the host without accessing the portion of the first information from the first memory in response to the first transaction.

25. The transceiver of claim 24 wherein the first memory comprises an EEPROM and wherein the second memory comprises a cache.

26. The transceiver of claim 24 further comprising:
a third means for storing second information in the second memory in response to receiving a second transaction configured to cause the second information to be stored in first second memory; and
a fourth means for storing the second information in the first memory subsequent to the third means storing the second information in the second memory.

27. The transceiver of claim 24 further comprising:
a laser configured to receive electrical signals from the host and configured to generate optical signal signals in response to the electrical signals.

* * * * *

UNITED STATES PATENT AND TRADEMARK OFFICE
CERTIFICATE OF CORRECTION

PATENT NO. : 7,107,414 B2
APPLICATION NO. : 10/346479
DATED : September 12, 2006
INVENTOR(S) : Takashi Hidai et al.

It is certified that error appears in the above-identified patent and that said Letters Patent is hereby corrected as shown below:

Column 8, Line 45, (Approx.), Claim 10, delete "signal";

Column 10, Line 45, Claim 27, delete "signal".

Signed and Sealed this

Ninth Day of November, 2010

David J. Kappos
*Director of the United States Patent and Trademark Office*